(12) United States Patent
Roesner et al.

(10) Patent No.: US 8,296,740 B2
(45) Date of Patent: Oct. 23, 2012

(54) ANNOTATING SYSTEM TRACES WITH CONTROL PROGRAM INFORMATION AND PRESENTING ANNOTATED SYSTEM TRACES

(75) Inventors: Wolfgang Roesner, Austin, TX (US);
Derek Edward Williams, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1036 days.

(21) Appl. No.: 12/057,829

(22) Filed: Mar. 28, 2008

(65) Prior Publication Data
US 2008/0178159 A1    Jul. 24, 2008

Related U.S. Application Data

(63) Continuation of application No. 10/880,730, filed on Jun. 30, 2004, now abandoned.

(51) Int. Cl.
*G06F 9/44* (2006.01)
(52) U.S. Cl. ........................................................ 717/128
(58) Field of Classification Search ........... 717/124–135
See application file for complete search history.

(56) References Cited

U.S. PATENT DOCUMENTS

| | | |
|---|---|---|
| 7,165,166 B2 | 1/2007 | Shimogori et al. |
| 2008/0178159 A1 | 7/2008 | Roesner et al. |

OTHER PUBLICATIONS

Synopsys, "VirSim User Guide", Oct. 2003, Version 4.4, Synopsys, Inc., 443 pages.*
Monaco et al., "Functional Verification Methodology for the PowerPC 604™ Microprocessor", 1996, ACM, pp. 1-6.*
Cheng et al., Application-based, Transistor-level Full-chip Power Analysis for 700 MHz PowerPC Microprocessor, 2000, IEEE, pp. 215-220.
ARM, ModelGen User Guide, 2001, www.arm.com, version4.3, 260 pages.
Knapp et al., Behavioral Synthesis Methodology for HDL-Based Specification and Validation, 1995, ACM, p. 1-6.
Roesner et al, U.S. Appl. No. 10/880,730, Final Office Action dated Mar. 18, 2009.
Roesner et al, U.S. Appl. No. 10/880,730, Office Action dated Sep. 3, 2008.

* cited by examiner

*Primary Examiner* — Ted T Vo
(74) *Attorney, Agent, or Firm* — Yudell Isidore Ng Russell PLLC (57) ABSTRACT

The signal state that a signal of interest within a system under test has during each of a plurality of cycles of operation of the system under test is stored in a trace file. In association with the signal state, information regarding a requested access to the signal state by a control program during a particular cycle among the plurality of cycles is also stored. From the trace files a presentation is generated that presents, for at least a signal of interest within the system under test, a plurality of signal state indications, each indicating a respective state that the signal had during a one of a plurality of cycles of operation of the system under test. The presentation also indicates, in a graphically distinctive manner, at least one cycle of operation during which a control program requested access to a state of the signal, so that the influence of the control program on the state of the system under test is visually apparent.

34 Claims, 6 Drawing Sheets

Signal X

| Cycle 402 | Signal state 404 | Calling routine name 406 | Call type 408 | Unmodified signal state 410 |
|---|---|---|---|---|
| ... | ... | ... | ... | ... |

400a

...

Signal Z

400n

| Cycle 402 | Signal state 404 | Calling routine name 406 | Call type 408 | Unmodified signal state 410 |
|---|---|---|---|---|
| ... | ... | ... | ... | ... |

ANNOTATING SYSTEM TRACES WITH CONTROL PROGRAM INFORMATION AND PRESENTING ANNOTATED SYSTEM TRACES

CROSS-REFERENCE TO RELATED APPLICATIONS

The present application is a continuation of U.S. patent application Ser. No. 10/880,730, filed on Jun. 30, 2004 now abandoned, entitled "Methods, Systems and Program Products for Annotating System Traces with Control Program Information and Presenting Annotated System Traces". Applicants claim benefit of priority under 35 U.S.C. §120 to U.S. patent application Ser. No. 10/880,730, which is incorporated by reference herein in its entirety and for all purposes.

BACKGROUND OF THE INVENTION

1. Technical Field

The present invention relates in general to recording and visualizing the operation of systems under test, and in particular, to methods, systems and program products for recording and visualizing the operation over time of a simulated system or module in which traces of particular signals are annotated with control program information.

2. Description of the Related Art

In a typical digital design process, verifying the logical correctness of a digital design and debugging the design (if necessary) are important steps of the design process performed prior to developing a circuit layout. Although it is certainly possible to test a digital design by actually building the digital design, digital designs, particularly those implemented by integrated circuitry, are typically verified and debugged by simulating the digital design on a computer, due in part to the time and expense required for integrated circuit fabrication.

In a typical automated design process, a circuit designer enters into an electronic computer-aided design (ECAD) system a high-level description of the digital design to be simulated utilizing a hardware description language (HDL), such as VHDL, thus producing a digital representation of the various circuit blocks and their interconnections. In the digital representation, the overall circuit design is frequently divided into smaller parts, hereinafter referred to as design entities, which are individually designed, often by different designers, and then combined in a hierarchical manner to create an overall model. This hierarchical design technique is very useful in managing the enormous complexity of the overall design and facilitates error detection during simulation.

The ECAD system compiles the digital representation of the design into a simulation model having a format best suited for simulation. A simulator then exercises the simulation model to detect logical errors in the digital design.

A simulator is typically a software tool that operates on the simulation model by applying a list of input stimuli representing inputs of the digital system. The simulator generates a numerical representation of the response of the system to the input stimuli, which response may then either be viewed on a display screen as a list of values or further interpreted, often by a separate software program, and presented on the display screen in graphical form. One common tool that is utilized to visualize the operation of a simulated system is a trace viewer (sometimes referred to as an All Events Trace (AET) viewer) that presents the states of various signals of interest within the system as they vary over time.

In current simulation environments, it is possible for a control program that controls the operation of the simulator to call API functions within the simulator to read and alter values within the simulation model. The present invention appreciates that when values are modified within a model during a simulation run in this manner, a designer can become confused regarding the true operation of the system. For example, logic within the design under test may have driven a signal to a particular value, while the control program has, in fact, driven the signal of interest to a different value. Because of these differences in values, a designer can waste significant time in debugging the trace based upon what are thought to be errors and which are, in fact, external manipulations of system state.

SUMMARY OF THE INVENTION

In view of the foregoing, the present invention provides improved methods, systems and program products for recording and presenting the state of a system under test.

In accordance with at least one embodiment of the present invention, the signal state that a signal of interest within a system under test has during each of a plurality of cycles of operation of the system under test is stored in a trace file. In association with the signal state, information regarding a requested access to the signal state by a control program during a particular cycle among the plurality of cycles is also stored.

In at least one embodiment of the invention, a presentation of the trace data within the trace file is generated. The presentation presents, for at least a signal of interest within the system under test, a plurality of signal state indications, each indicating a respective state that the signal had during a one of a plurality of cycles of operation of the system under test. The presentation also indicates, in a graphically distinctive manner, at least one cycle of operation during which a control program requested access to a state of the signal, so that the influence of the control program on the state of the system under test is visually apparent.

All objects, features, and advantages of the present invention will become apparent in the following detailed written description.

BRIEF DESCRIPTION OF THE DRAWINGS

The novel features believed characteristic of the invention are set forth in the appended claims. However, the invention, as well as a preferred mode of use, will best be understood by reference to the following detailed description of an illustrative embodiment when read in conjunction with the accompanying drawings, wherein:

DETAILED DESCRIPTION OF ILLUSTRATIVE EMBODIMENT

Figure 1:
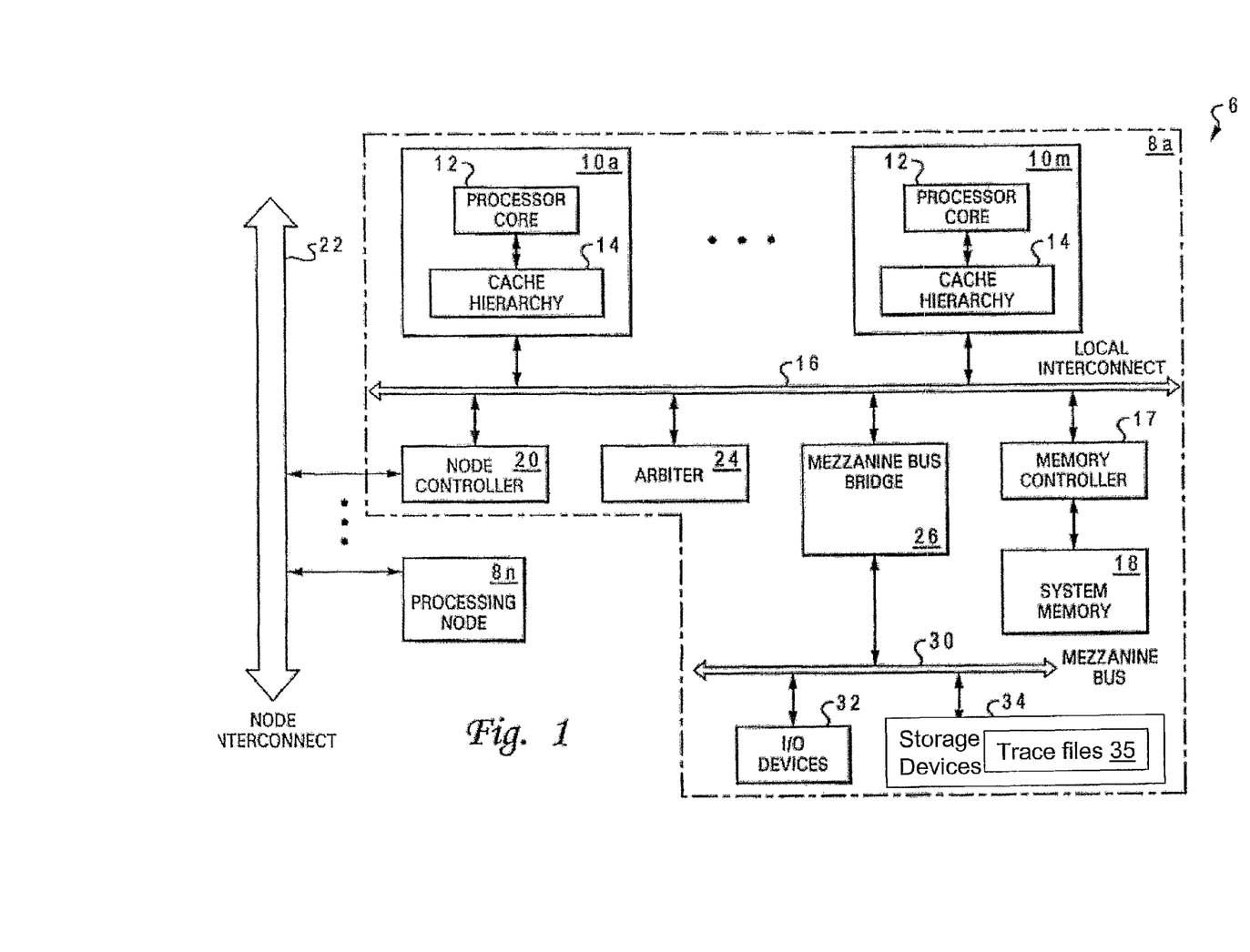
FIG. 1 is a high level block diagram of a data processing system that may be utilized to implement the present invention.

With reference now to the figures, and in particular with reference to FIG. 1, there is depicted an exemplary embodiment of a data processing system in accordance with the present invention. The depicted embodiment can be realized, for example, as a workstation, server, or mainframe computer.

As illustrated, data processing system 6 includes one or more processing nodes 8a-8n, which, if more than one processing node 8 is implemented, are interconnected by node interconnect 22. Processing nodes 8a-8n may each include one or more processors 10, a local interconnect 16, and a system memory 18 that is accessed via a memory controller 17. Processors 10a-10m are preferably (but not necessarily) identical and may comprise a processor within the PowerPC™ line of processors available from International Business Machines (IBM) Corporation of Armonk, N.Y. In addition to the registers, instruction flow logic and execution units utilized to execute program instructions, which are generally designated as processor core 12, each of processors 10a-10m also includes an on-chip cache hierarchy 14 that is utilized to stage data to the associated processor core 12 from system memories 18.

Each of processing nodes 8a-8n further includes a respective node controller 20 coupled between local interconnect 16 and node interconnect 22. Each node controller 20 serves as a local agent for remote processing nodes 8 by performing at least two functions. First, each node controller 20 snoops the associated local interconnect 16 and facilitates the transmission of local communication transactions to remote processing nodes 8. Second, each node controller 20 snoops communication transactions on node interconnect 22 and masters relevant communication transactions on the associated local interconnect 16. Communication on each local interconnect 16 is controlled by an arbiter 24. Arbiters 24 regulate access to local interconnects 16 based on bus request signals generated by processors 10 and compile coherency responses for snooped communication transactions on local interconnects 16.

Local interconnect 16 is coupled, via mezzanine bus bridge 26, to a mezzanine bus 30. Mezzanine bus bridge 26 provides both a low latency path through which processors 10 may directly access devices among I/O devices 32 and storage devices 34 that are mapped to bus memory and/or I/O address spaces and a high bandwidth path through which I/O devices 32 and storage devices 34 may access system memory 18. I/O devices 32 may include, for example, a display device, a printer, a keyboard, a graphical pointer, and serial and parallel ports for connection to external networks or attached devices. Storage devices 34 may include, for example, optical or magnetic disks that provide non-volatile storage for operating system, middleware and application software. Storage devices 34 may further store data regarding the operation of a simulated or hardware system under test, which is depicted as trace files 35.

Figure 2:
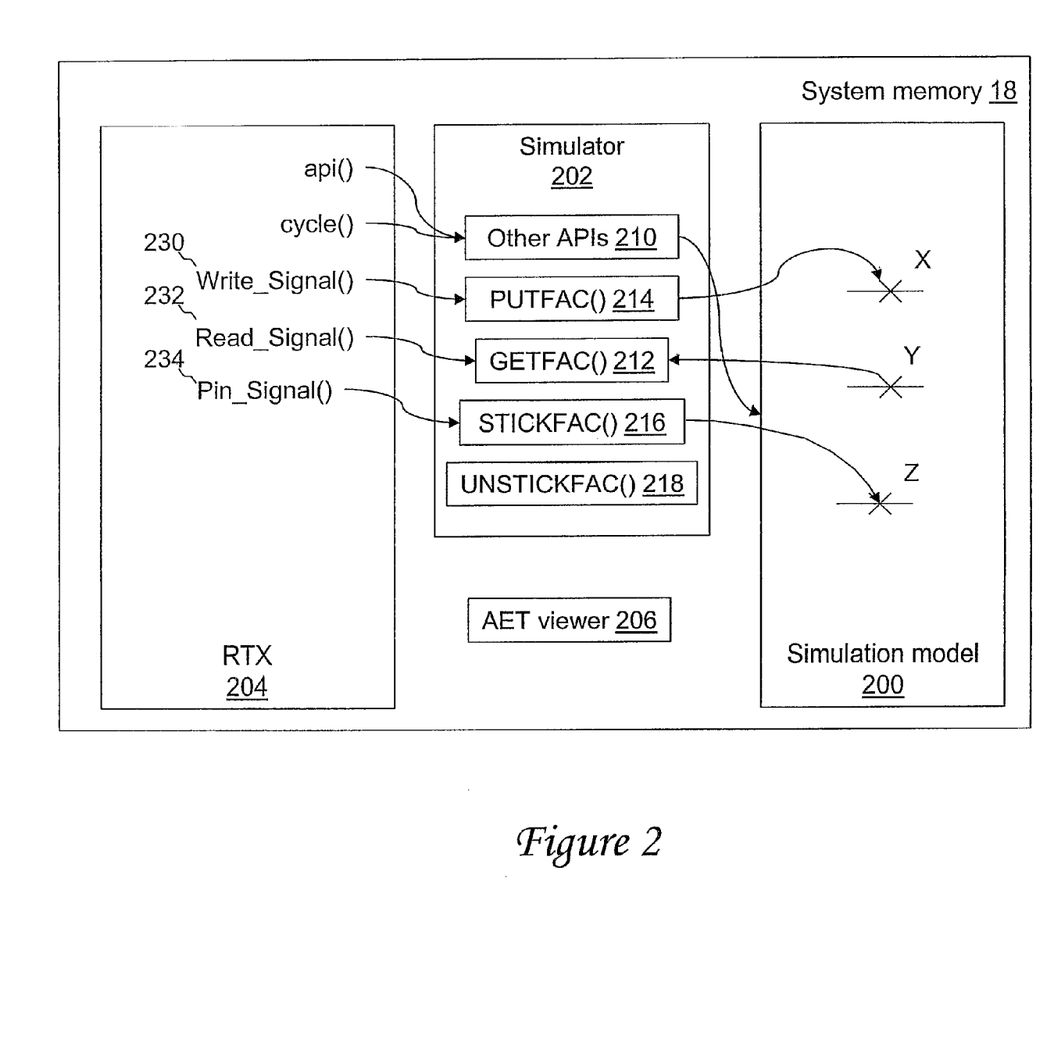
FIG. 2 is a block diagram depicting the contents of volatile system memory during a simulation run of a simulation model in accordance with the present invention.

Referring now to FIG. 2, there is illustrated a block diagram depicting exemplary contents of system memory 18 data processing system 6 of FIG. 1 during the simulation of a simulation model. As shown, system memory 18 includes a simulation model 200, which is a logical representation of the digital design to be simulated, as well as software including a testing tool (e.g., simulator 202), a simulation control program or Run Time eXecutive (RTX) 204, and a viewer tool referred to herein as an All Events Trace (AET) viewer 206.

Simulator 202 loads simulation models, such as simulation model 200, into system memory 18 and interacts directly with the simulation models through its Application Programming Interfaces (APIs). For example, during a simulation run, simulator 202 resets, clocks and evaluates simulation model 200 via various APIs 210. In addition, simulator 202 reads values (e.g., signal states or latch values) at a particular point in time in simulation model 200 utilizing GETFAC( ) API 212 and writes values, typically for a single simulation cycle, to simulation model 200 utilizing PUTFAC( ) API 214. In the illustrated embodiment, simulator 202 also provides STICKFAC( ) API 216, which persistently sets a signal (or latch) in simulation model 200 to a specified state until unset, and UNSTICKFAC( ) API 218, which unsets a persistently set signal within simulation model 200. Simulator 202 further stores the time-varying states of simulation model 200 in trace files 35 within storage devices 34 so that the time-varying behavior of simulation model 200 can be analyzed and visualized. Although simulator 202 is implemented in FIG. 2 entirely in software, it will be appreciated by those skilled in the art that the simulator can alternatively be implemented at least partially in hardware.

RTX 204 controls simulation of simulation models, such as simulation model 200. For example, RTX 204 loads test cases to apply to simulation model 200. In addition, RTX 204 delivers a set of API calls to the APIs provided by simulator 202 to initialize, configure, and run simulation model 200. During and after simulation, RTX 204 also calls the APIs provided by simulator 202 to check for the correctness of simulation model 200 by accessing various signals and latches within simulation model 200.

AET viewer 206 supports cycle-based analysis of simulation model 200 by presenting the states of signals (or latches) of interest within simulation model 200 as a function of simulation clock cycles. In order to present this data, AET viewer 206 accesses trace files 35 within storage devices 34 and presents the trace data contained therein in a selected format, for example, in a tabular format or graphical format on a hardcopy printout or in a graphical user interface (GUI) presentation. As is appreciated by those skilled in the art, the ability to analyze and visualize the states of time-varying signals in this manner provides a powerful tool for debugging the system under test represented by simulation model 200.

As discussed briefly above, the present invention recognizes that the utility of AET viewer 206 in presenting and debugging the time-varying state of a system under test is enhanced if access to and manipulation of the system under test (e.g., simulation model 200) by RTX 204 is made explicit in the presentation of the trace data. In this manner, changes in system state forced by RTX 204 can be more readily distinguished from errors within simulation model 200. In order to permit AET viewer 206 to present accesses to simulation model 200 by RTX 204, simulator 202 preferably annotates trace files 35 with information regarding API calls by RTX 204, as described in detail below.

Figure 3:
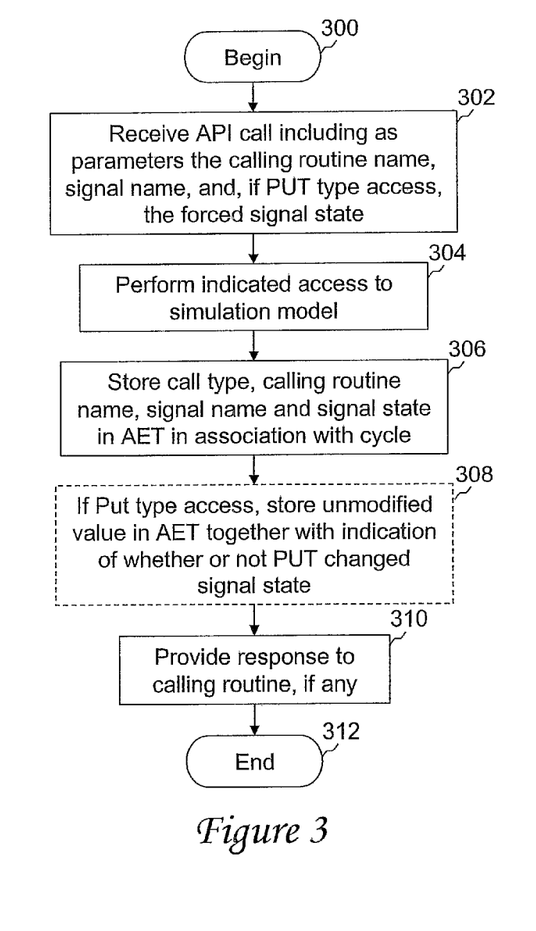
FIG. 3 is a high level logical flowchart of an exemplary process by which a simulator handles an API call by a simulation control program (e.g., Run Time eXecutive (RTX)) that accesses one or more signal states in a simulation model.

With reference now to FIG. 3, there is illustrated a high level logical flowchart of an exemplary process by which simulator 202 handles an API call by RTX 204 in accordance with a preferred embodiment of the present invention. As shown, the process begins at block 300 and thereafter proceeds to block 302, which illustrates simulator 202 receiving an API call from a routine within RTX 204 that requests an access to a signal (or latch) state within simulation model 200. For example, as shown in FIG. 2, the RTX routine Write_Signal 230 may issue a call to PUTFAC( ) API 214, the RTX routine Read_Signal 232 may issue a call to GETFAC( ) API 212, or the RTX routine Pin_Signal 234 may issue a call to STICKFAC( ) API 216 or UNSTICKFAC( ) API 218. As indicated at block 302 of FIG. 3, each of these API calls preferably includes in its parameter list the name of the calling routine (e.g., Write_Signal), a signal (or latch) name, and if a PUT-type access, the signal (or latch) state to which the specified signal or latch is to be forced.

Following block 302, the process proceeds to block 304, which depicts simulator 202 performing the indicated access to simulation model 200. For example, an API call to GETFAC( ) API 212 causes GETFAC( ) API 212 to read the state of the selected signal from simulation model 200, and an API call to PUTFAC( ) API 214 causes PUTFAC( ) API 214 to set the specified signal within simulation model 200 to the indicated state for the given simulation cycle. Next, as shown at block 306, simulator 202 stores in a trace file 35 information regarding the current simulation cycle. For example, as depicted within block 306, simulator 202 stores in association with the current simulation cycle, the type of API call (e.g., PUT or GET), the name of the calling routine within RTX 204, the signal name of the signal accessed in response to the API call, and the signal state. As shown at block 308, for PUT-type accesses that modify a signal state within simulation model 200, simulator 202 may optionally store the unmodified state of the signal and, again optionally, a further indication of whether or not the signal state specified in the PUT-type API call modified the signal state. If multiple PUT-type accesses are made to a particular signal in the same cycle, states are applied to the signal in the order the PUT-type API calls are made, so that the final signal state is that specified by the last PUT-type API call prior to cycling simulation model 200.

Following block 308, the process proceeds to block 310, which depicts simulator 202 providing a response, if any, to the calling RTX routine. For example, if simulator 202 received an API call to GETFAC( ) API 212 from Read_Signal routine 232, simulator 202 returns to Read_Signal routine 232 the state of the specified signal. Simulator 200 may not provide responses to other RTX calling routines or may simply provide a completion response. Following block 310, the process terminates at block 312.

Figure 4:
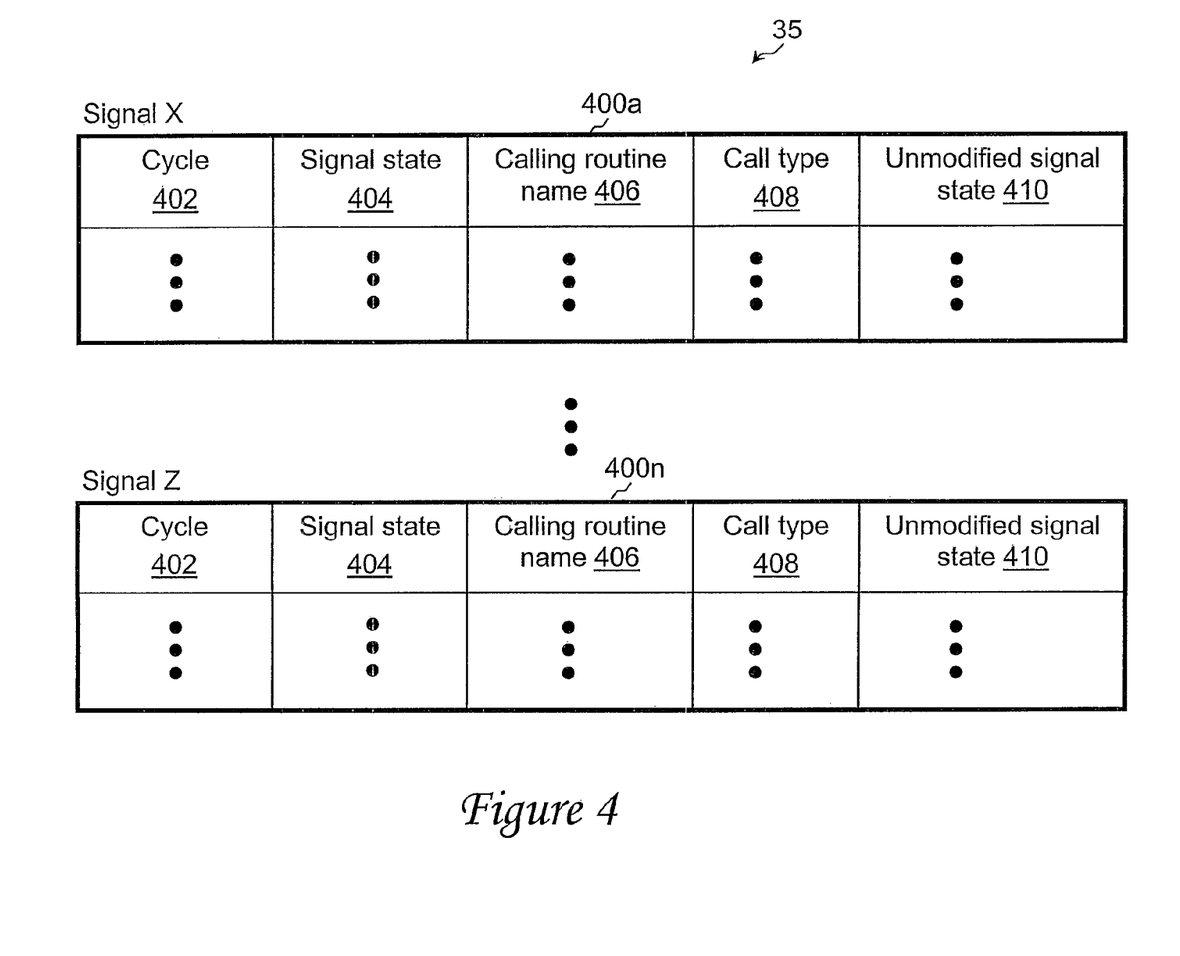
FIG. 4 depicts an exemplary trace file generated by the simulator in accordance with a preferred embodiment of the present invention.

Referring now to FIG. 4, there is depicted a logical representation of an exemplary trace file 35 created by simulator 202 in accordance with the present invention. Those skilled in the art will appreciate that the depicted data structures are merely exemplary, and that a wide variety of other formats for trace files 35 may be employed. For example, in other embodiments a more compact trace file may be obtained by recording only changes to signal states or by selectively storing only user-specified accesses to the simulation model (e.g., only GETs or only PUTs).

As shown, exemplary trace file 35 is logically arranged as a series of tables 400a-400n, which each stores trace data for a respective signal of interest over a simulation run. Each table 400 logically contains multiple rows each corresponding to a particular simulation cycle and multiple columns for storing trace data associated with the cycles. In the depicted embodiment, the columns in each table 400 include a signal state column 404 for storing the signal state during the indicated simulation cycle, a calling routine name column 406 for storing the name of an RTX calling routine, if any, accessing the signal during the indicated simulation cycle, a call type column 408 for storing an indication of the type (e.g., GET or PUT) of the RTX calling routine, and an unmodified signal state column 410 for storing the unmodified state of the signal if a PUT-type routine requests access to the simulation model 200.

Utilizing the above information within trace files 35, AET viewer 206 can present a tabular or graphical representation of the trace data that indicates accesses to simulation model 200 in response to API calls by RTX 204 in a graphically distinctive manner. In one preferred embodiment of the present invention, AET viewer 206 presents the trace data in graphical form (e.g., within a hardcopy printout or on a display device), and accesses to simulation model 200 in response to API calls by RTX 204 are depicted in a graphically distinctive manner.

Figure 5A:
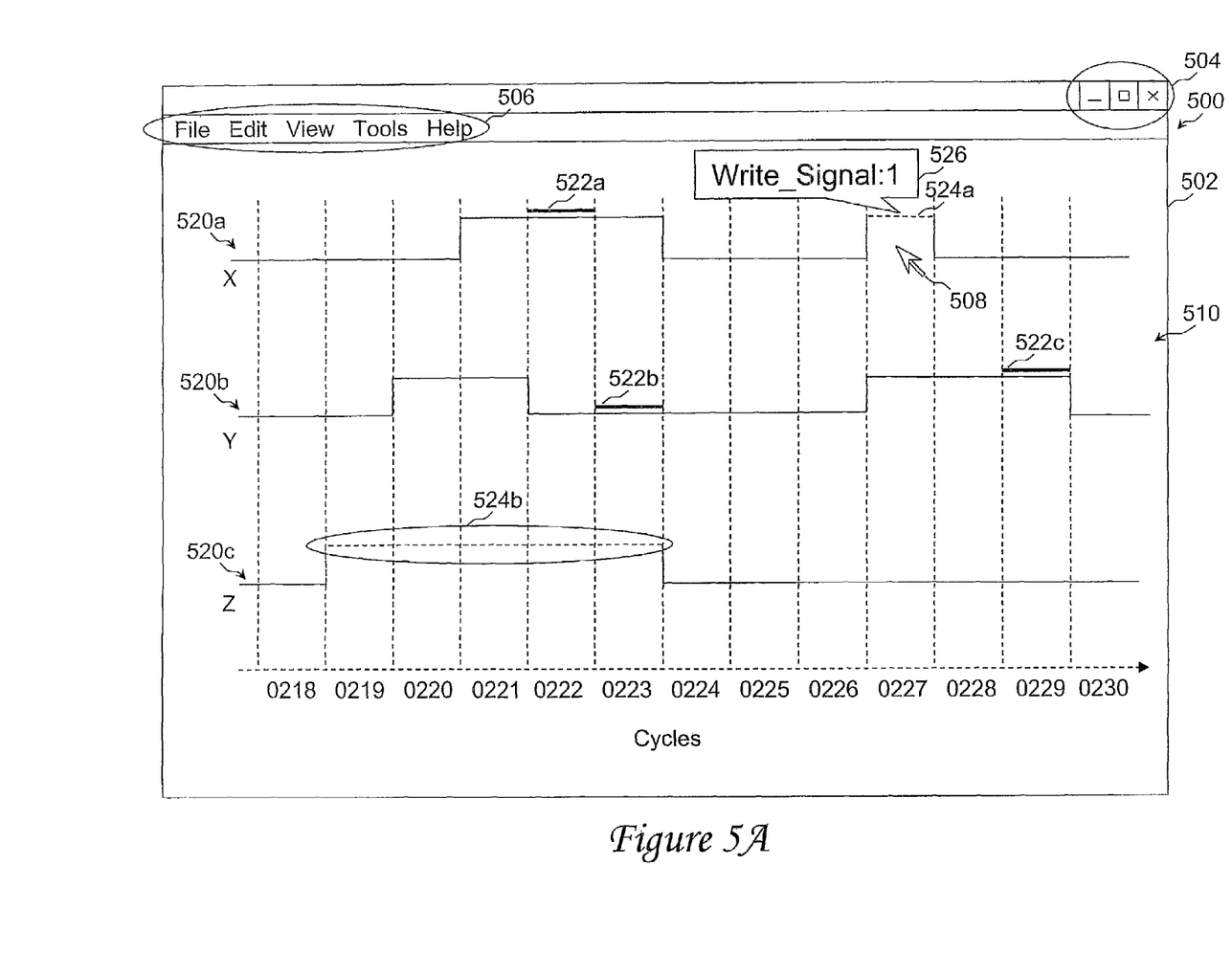
FIG. 5A illustrates a first view of an exemplary embodiment of a graphical user interface (GUI) in which traces of signals accessed by a simulation control program are presented in a graphically distinct manner.

With reference now to FIG. 5A, there is illustrated a first view of an exemplary embodiment of a graphical user interface (GUI) 500 generated by AET viewer 206 within the display of a display device among I/O devices 32 based upon trace data within a trace file 35. In accordance with the present invention, graphical representations of signal states accessed by a simulation control program, such as an RTX, are presented within GUI 500 in a graphically distinctive manner.

As shown, GUI 500 includes conventional GUI components, such as window 502, control buttons 504, pull down menus 506, and a cursor 508 controlled by a user input device, such as a mouse. Although not illustrated, GUI 500 may, of course, include other additional conventional or non-conventional GUI features, such as tool bars, scroll bars, etc. to facilitate user interaction with and manipulation of GUI 500.

Window 502 further contains a frame 510 within which graphical representations of time-varying signals of interest are presented. For example, GUI 500 presents within frame 510 graphical signal representations 520a, 520b and 520c of the states of signals X, Y and Z, respectively, of simulation model 200 as a function of simulation cycles. As shown, each graphical signal representation 520 comprises a plurality of segments, each representing the state of the associated signal during one or more simulation cycles. The presentation of graphical signal representations 520a-520c can readily be generated, for example, from signal state columns 404 of the tables 400 for the signals of interest.

In order for a user to be able to visually distinguish simulation cycles in which RTX 204 made API calls to access signal states, GUI 500 presents signal segments accessed in response to an RTX API call in a graphically distinct manner. The distinctive display may incorporate line style, line weight, color, reverse video, underlining, text or any other visually discernable parameter. Further, the display parameters may be user-selected, for example, by making appropriate selections within the "View" pull-down menu utilizing cursor 508. In the depicted embodiment, GUI 500 presents segments 522a, 522b, and 522c corresponding to signal states read from simulation model 200 by GETFAC( ) API 212 in response to an RTX API call utilizing underlining. In this manner, a user can determine at a glance that RTX 204 called GETFAC( ) API 212 to read the state of signal X during simulation cycle 0222 and to read the state of signal Y during simulation cycles 0223 and 0229.

GUI 500 of AET viewer 206 similarly presents segments 524a, 524b corresponding to signal states forced on simulation model 200 by PUTFAC( ) API 214 or STICKFAC( ) API 216 in a graphical distinctive manner. In the illustrated embodiment, such signal states are presented utilizing dashed lines. Thus, the user can readily determine that RTX 204 forced a logic high state on signal X during simulation cycle 227 and forced a logic high state on signal X during simulation cycles 0219 through 0223.

As will be appreciated, AET viewer 206 can determine which segments to present in a graphically distinctive manner and which graphically distinctive characteristic to apply to such segments based upon the trace data contained in columns 408 of tables 400.

Figure 5B:
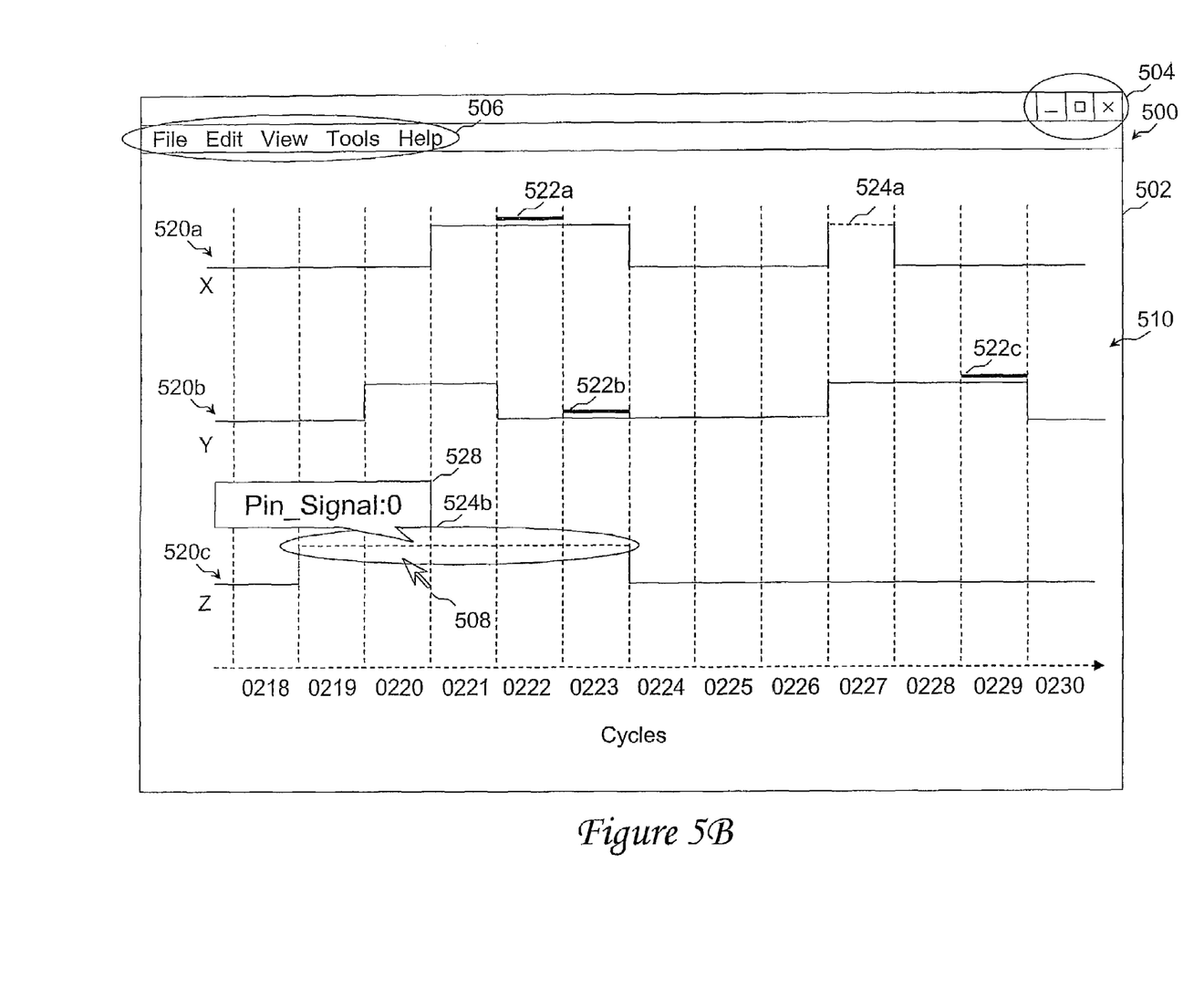
FIG. 5B depicts a second view of an exemplary embodiment of a graphical user interface (GUI) in which traces of signals accessed by a simulation control program are presented in a graphically distinct manner.

GUI 500 also advantageously provides the user with information regarding which RTX routine issued each API call. In the depicted embodiment, this information is presented as flyover text in response to the user positioning cursor 508 within abounding region surrounding a signal segment representing a GET or PUT-type access to simulation model 200. For example, GUI 500 presents flyover text 526 in response to cursor 508 being positioned adjacent segment 524a to indicate that a call to PUTFAC( ) API 214 was made by Write_Signal routine 230 of RTX 204. Similarly, in the second view of GUI 500 shown in FIG. 5B, GUI 500 presents flyover text 528 in response to cursor 508 being positioned adjacent segment 524b to indicate that a call to STICKFAC( ) API 216 was made by Pin_Signal routine 234 of RTX 204. Advantageously, for PUT-type accesses made by PUTFAC( ) API 214 and STICKFAC( ) API 216, the flyover text may further indicate the state of the signal would have had absent the API call (e.g., "0" or "1"). The RTX routine names and unmodified signal values may be obtained by AET viewer 206, for example, from the trace data within columns 406 and 410 of tables 400. In the case in which multiple PUTs and/or GETs to a signal are performed in a single simulation cycle, the signal value and routine name that are presented within GUI 500 are the last to be recorded in the record for a the simulation cycle.

As has been described, the present invention supports the annotation of trace data with indications of accesses to the system under test in response to requests by a control program. The present invention further supports the presentation of the annotated trace data so that signal states accessed by the control program are presented in a graphically distinctive manner.

While the invention has been particularly shown as described with reference to a preferred embodiment, it will be understood by those skilled in the art that various changes in form and detail may be made therein without departing from the spirit and scope of the invention. For example, it will be appreciated that although the present invention has been described with respect to one preferred embodiment in which a software simulator is employed, the inventive concepts disclosed herein are equally applicable to the debugging and presentation of system state of systems under test by a hardware simulator. In addition, those skilled in the art will appreciate that the present invention is applicable not only to cycle-based simulators, but also to event-driven simulators.

Furthermore, although aspects of the present invention have been described with respect to a computer system executing software that directs the functions of the present invention, it should be understood that present invention may alternatively be implemented as a program product for use with a data processing system. Programs defining the functions of the present invention can be delivered to a data processing system via a variety of storage media, which include non-rewritable storage media (e.g., CD-ROM) and rewritable storage media (e.g., a floppy diskette or hard disk drive), but exclude communication media, such as digital and analog networks. It should be understood, therefore, that such storage media, when storing computer readable instructions that direct the functions of the present invention, represent alternative embodiments of the present invention.

What is claimed is:

1. A method of recording the operation of a system under test, said method comprising:
   stimulating a system under test with a testcase utilizing a simulator;
   controlling operation of the simulator with a separate simulation control program;
   in a trace file within a storage device, storing a signal state of a signal of interest within the system under test for each of a plurality of cycles of operation of the system under test on the testcase; and
   storing, in the trace file in association with the signal state of the signal of interest during a particular cycle among the plurality of cycles, information regarding a requested access during that particular cycle by the separate simulation control program to the signal state.

2. The method of claim 1, wherein storing information regarding a requested access comprises:
   storing an identifier of a control program routine that requested said access.

3. The method of claim 1, wherein storing information regarding a requested access comprises:
   storing an indication of whether said access is a GET-type access or a PUT-type access.

4. The method of claim 1, wherein storing information regarding a requested access comprises:
   storing an indication of a state that said particular signal would have had in absence of said access.

5. The method of claim 1, wherein:
   said system under test is a simulation model; and
   said step of storing information regarding said requested access comprises the simulator storing information regarding the requested access by the simulation control program.

6. The method of claim 1, and further comprising:
   presenting, for the signal of interest within the system under test, a plurality of signal state indications each indicating a respective state that said signal had during one of the plurality of cycles of operation of the system under test; and
   indicating, in a graphically distinctive manner, at least one cycle of operation during which the simulation control program requested access to the state of said signal.

7. A method of presenting a time-varying state of a system under test, said method comprising:
   a data processing system presenting, for at least a signal of interest within the system under test, a plurality of signal state indications each indicating a respective state that said signal had during one of a plurality of cycles of operation of the system under test on a testcase applied to the system under test by a simulator; and
   the data processing system indicating, in a graphically distinctive manner, at least one cycle of operation during which a simulation control program, separate from and controlling operation of the simulator, requested access to a state of said signal.

8. The method of claim 7, wherein presenting a plurality of signal state indications comprises:
   presenting a graphical signal representation including a plurality of segments each indicating a particular signal state.

9. The method of claim 8, wherein said indicating comprises presenting one or more of said plurality of segments in a graphically distinctive manner.

10. The method of claim 7, and further comprising:
    presenting, in association with said cycle of operation in which the simulation control program requested access to the state of said signal, an identifier of a calling routine within said simulation control program.

11. The method of claim 7, and further comprising:
presenting, in association with said cycle of operation in which the simulation control program requested access to the state of said signal, a signal state said signal would have had absent said access.

12. A data processing system for recording the operation of a system under test, said data processing system comprising:
a processor; and
data storage coupled to said processor and containing a program code executable by said processor to cause said data processing system to perform:
stimulating a system under test with a testcase utilizing a simulator controlled by a separate simulation control program;
storing, in a trace file within the data storage, a signal state of a signal of interest within the system under test for each of a plurality of cycles of operation of the system under test on the testcase; and
storing, in the trace file in association with the signal state of the signal of interest during a particular cycle among the plurality of cycles, information regarding a requested access during that particular cycle by the separate simulation control program to the signal state.

13. The data processing system of claim 12, wherein said information comprises an identifier of a control program routine that requested said access.

14. The data processing system of claim 12, wherein said information comprises an indication of whether said access is a GET-type access or a PUT-type access.

15. The data processing system of claim 12, wherein said information comprises an indication of a state that said particular signal would have had in absence of said access.

16. The data processing system of claim 12, wherein:
said system under test is a simulation model; and
said program code comprises a simulator.

17. The data processing system of claim 12, and further comprising:
a viewer tool within the data storage and executable by said data processing system to cause the data processing system to generate a presentation that presents, for the signal of interest within the system under test, a plurality of signal state indications each indicating a respective state that said signal had during one of the plurality of cycles of operation of the system under test and that indicates, in a graphically distinctive manner, at least one cycle of operation during which the simulation control program requested access to the state of said signal.

18. A data processing system for generating a presentation of a time-varying state of a system under test within a presentation device, said data processing system comprising:
a processor; and
data storage coupled to said processor and containing a viewer tool executable by said processor to generate a presentation that presents, for at least a signal of interest within the system under test on a testcase applied to the system under test by a simulator, a plurality of signal state indications each indicating a respective state that said signal had during a one of a plurality of cycles of operation of the system under test and that indicates, in a graphically distinctive manner, at least one cycle of operation during which a simulation control program, separate from and controlling operation of the simulator, requested access to a state of said signal.

19. The data processing system of claim 18, wherein said plurality of signal state indications comprises a graphical signal representation including a plurality of segments each indicating a particular signal state.

20. The data processing system of claim 19, wherein said presentation indicates said at least one cycle of operation by presenting one or more of said plurality of segments in a graphically distinctive manner.

21. The data processing system of claim 18, wherein said presentation of said viewer tool further presents, in association with said cycle of operation in which the simulation control program requested access to the state of said signal, an identifier of a calling routine within said simulation control program.

22. The data processing system of claim 18, wherein said presentation of said viewer tool further presents, in association with said cycle of operation in which the simulation control program requested access to the state of said signal, a signal state said signal would have had absent said access.

23. The data processing system of claim 18, and further comprising the presentation device coupled to said processor.

24. A program product for recording the operation of a system under test, said program product comprising:
a tangible computer-usable storage medium; and
program code within said computer-usable storage medium and executable by a data processing system to cause said data processing system to perform:
stimulating a system under test with a testcase utilizing a simulator controlled by a separate simulation control program;
storing, in a trace file within the data storage, a signal state of a signal of interest within the system under test for each of a plurality of cycles of operation of the system under test on the testcase; and
storing, in the trace file in association with the signal state of the signal of interest during a particular cycle among the plurality of cycles, information regarding a requested access during that particular cycle by the separate simulation control program to the signal state.

25. The program product of claim 24, wherein said information comprises an identifier of a control program routine that requested said access.

26. The program product of claim 24, wherein said information comprises an indication of whether said access is a GET-type access or a PUT-type access.

27. The program product of claim 24, wherein said information comprises an indication of a state that said particular signal would have had in absence of said access.

28. The program product of claim 24, wherein:
said system under test is a simulation model; and
said program code comprises a simulator.

29. The program product of claim 24, and further comprising:
a viewer tool within the computer-usable medium and executable by a data processing system to cause the data processing system to generate a presentation that presents, for the signal of interest within the system under test, a plurality of signal state indications each indicating a respective state that said signal had during one of the plurality of cycles of operation of the system under test and that indicates, in a graphically distinctive manner, at least one cycle of operation during which the simulation control program requested access to a state of said signal.

30. A program product for generating a presentation of a time-varying state of a system under test within a presentation device, said program product comprising:
- a tangible computer-usable storage medium; and
- a viewer tool within said computer-usable storage medium and executable by a data processing system to generate a presentation that presents, for at least a signal of interest within the system under test on a testcase applied to the system under test by a simulator, a plurality of signal state indications each indicating a respective state that said signal had during a one of a plurality of cycles of operation of the system under test and that indicates, in a graphically distinctive manner, at least one cycle of operation during which a simulation control program, separate from and controlling operation of the simulator, requested access to a state of said signal.

31. The program product of claim 30, wherein said plurality of signal state indications comprises a graphical signal representation including a plurality of segments each indicating a particular signal state.

32. The program product of claim 31, wherein said presentation indicates said at least one cycle of operation by presenting one or more of said plurality of segments in a graphically distinctive manner.

33. The program product of claim 30, wherein said presentation of said viewer tool further presents, in association with said cycle of operation in which the simulation control program requested access to the state of said signal, an identifier of a calling routine within said simulation control program.

34. The program product of claim 30, wherein said presentation of said viewer tool further presents, in association with said cycle of operation in which the simulation control program requested access to the state of said signal, a signal state said signal would have had absent said access.

* * * * *